US010516661B2

(12) United States Patent
Wetterwald et al.

(10) Patent No.: US 10,516,661 B2
(45) Date of Patent: Dec. 24, 2019

(54) VIRTUAL ELECTRONIC SECURITY PERIMETER USING DETERMINISTIC NETWORKING

(71) Applicant: Cisco Technology, Inc., San Jose, CA (US)

(72) Inventors: Patrick Wetterwald, Mouans Sartoux (FR); Maik Seewald, Nuremberg (DE)

(73) Assignee: Cisco Technology, Inc., San Jose, CA (US)

(*) Notice: Subject to any disclaimer, the term of this patent is extended or adjusted under 35 U.S.C. 154(b) by 121 days.

(21) Appl. No.: 15/430,617

(22) Filed: Feb. 13, 2017

(65) Prior Publication Data

US 2017/0353446 A1    Dec. 7, 2017

Related U.S. Application Data

(60) Provisional application No. 62/345,407, filed on Jun. 3, 2016.

(51) Int. Cl.
*H01L 29/06* (2006.01)
*H04L 29/06* (2006.01)
*H04L 29/08* (2006.01)

(52) U.S. Cl.
CPC ...... *H04L 63/0823* (2013.01); *H04L 63/0209* (2013.01); *H04L 67/12* (2013.01); *Y04S 40/18* (2018.05)

(58) Field of Classification Search
CPC ............................ H04L 63/0823; H04L 67/12
USPC .......................................................... 726/10
See application file for complete search history.

(56) References Cited

U.S. PATENT DOCUMENTS

| 6,671,821 | B1 * | 12/2003 | Castro ............... G06F 17/30212 |
| | | | 707/E17.007 |
| 7,143,283 | B1 | 11/2006 | Chen et al. |
| 7,630,326 | B1 * | 12/2009 | Shear .................. H04L 41/0813 |
| | | | 370/254 |
| 9,270,701 | B1 | 2/2016 | Lamb et al. |
| 9,319,424 | B2 | 4/2016 | Hudson et al. |
| 2008/0134297 | A1 * | 6/2008 | Clinick ................... G06F 21/51 |
| | | | 726/4 |
| 2011/0055557 | A1 * | 3/2011 | Nakamura .............. G06F 21/33 |
| | | | 713/156 |

(Continued)

OTHER PUBLICATIONS

Prasath, Arun, "Engineering Best Practices for Substation Networking Design", online page: https://www.linkedin.com/pulse/engineering-best-practices-substation-networking-design-arun-prasath, May 2, 2015, 17 pages, LinkedIn.

*Primary Examiner* — Haresh N Patel
(74) *Attorney, Agent, or Firm* — Behmke Innovation Group LLC; James Behmke; Stephen D. LeBarron

(57) ABSTRACT

In one embodiment, a supervisory device for a network of a power substation identifies a plurality of nodes in the network of the power substation. The supervisory device associates each of the nodes with one or more security certificates. A particular security certificate authenticates a particular node to the supervisory device and authorizes the particular node to communicate in the network of the power substation. The supervisory device determines a security perimeter for the nodes in the network. The supervisory device schedules communications among the nodes using the one or more security certificates and based on the determined security perimeter.

20 Claims, 7 Drawing Sheets

(56) References Cited

U.S. PATENT DOCUMENTS

| | | | |
|---|---|---|---|
| 2012/0087656 A1* | 4/2012 | Rourke | H04L 12/40045 398/43 |
| 2012/0198226 A1* | 8/2012 | Wimmer | G06F 21/57 713/100 |
| 2012/0266209 A1* | 10/2012 | Gooding | H04L 63/20 726/1 |
| 2013/0104236 A1* | 4/2013 | Ray | H04L 63/1433 726/25 |
| 2013/0128895 A1* | 5/2013 | Kirrmann | H04L 12/4015 370/412 |
| 2013/0132555 A1* | 5/2013 | Wang | H04B 3/544 709/223 |
| 2014/0245409 A1* | 8/2014 | Falk | G06Q 10/10 726/6 |
| 2015/0281278 A1* | 10/2015 | Gooding | H04L 63/20 726/1 |
| 2016/0182344 A1* | 6/2016 | Subhedar | H04L 1/24 370/241.1 |

\* cited by examiner

VIRTUAL ELECTRONIC SECURITY PERIMETER USING DETERMINISTIC NETWORKING

RELATED APPLICATION

This application claims priority to U.S. Provisional Application No. 62/345,407, filed on Jun. 3, 2016, entitled VIRTUAL ELECTRONIC SECURITY PERIMETER USING DETERMINISTIC NETWORKING, by Wetterwald, et al., the contents of which are incorporated herein by reference.

TECHNICAL FIELD

The present disclosure relates generally to computer networks, and, more particularly, to a virtual electronic security perimeter using deterministic networking.

BACKGROUND

Critical infrastructure is becoming increasingly automated. For example, many electrical power grids are joined to a communication network, allowing for remote and/or autonomous control over their components, such as the various equipment located in a power substation. By networking critical infrastructure, the provider can quickly adapt to changes and failures, often without requiring the deployment of a technician to a remote location. However, by connecting critical infrastructure to a communication network, cybersecurity must also be taken into account to protect the infrastructure, in addition to the physical security of the infrastructure.

With the North American Electric Reliability Corporation (NERC) Critical Infrastructure Protection (CIP) initiative, the United States government has defined and enforced an electronic security perimeter for all equipment used for electrical transmission and distribution. These new rules have been applied since 2015. Basically, all communications regarding mission critical functions must be contained within a security perimeter, and all communications in and out of this perimeter must go through an Access Point ruled by strict authorization and encryption mechanisms. However, the NERC CIP initiatives provide only the target requirements for a network, leaving the specific implementation details up to the end user.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
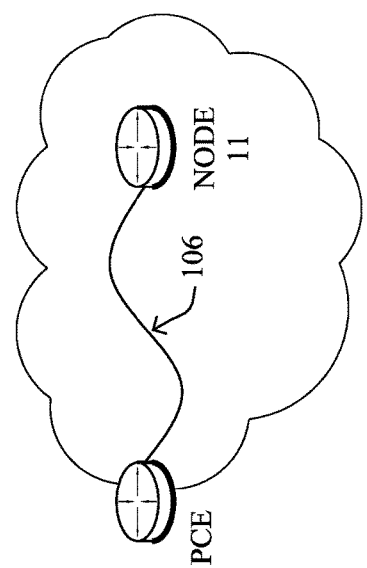
FIG. 1 illustrates an example communication network.
Figure 1:

According to one or more embodiments of the disclosure, a supervisory device for a network of a power substation identifies a plurality of nodes in the network of the power substation. The supervisory device associates each of the nodes with one or more security certificates. A particular security certificate authenticates a particular node to the supervisory device and authorizes the particular node to communicate in the network of the power substation. The supervisory device determines a security perimeter for the nodes in the network. The supervisory device schedules communications among the nodes using the one or more security certificates and based on the determined security perimeter.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In general, deterministic networking attempts to precisely control when a data packet arrives at its destination. This category of networking has seen increased interest in a myriad of applications such as industrial automation, vehicle control systems, and other systems that require the precise delivery of control commands to a controlled device. One such deterministic protocol is Deterministic Ethernet, which promises no packet loss and reduced jitter for time sensitive traffic. This is accomplished through careful ad-hoc scheduling of streams that is mostly done off-line and often enforces some constraints to streams.

Because of the time sensitivity and zero packet loss constraints in Deterministic Ethernet, each network node has to be synced with a main clock and bridges have to follow a specific scheduling. Usually an entity called a path computation element (PCE) that knows the network topology, the constraints of the networks, and the requirements of the data streams, is in charge of defining the path and the scheduling algorithm for each node of the network. Among all these constraints, scheduling network traffic in Deterministic Ethernet applications is simplified somewhat because data streams are periodic, thereby allowing stream scheduling to be solved within one time period.

FIG. 1 is a schematic block diagram of an example simplified computer network 100 illustratively comprising nodes/devices 200 interconnected by various methods of communication. Those skilled in the art will understand that any number of nodes, devices, links, etc. may be used in the computer network, and that the view shown herein is for simplicity. Network 100 may also include a path computation element (PCE) that determines a communication path 106 via which data is routed through any number of intermediary nodes to arrive at a node 11.

According to some embodiments, network 100 is a deterministic network that implements a deterministic protocol, such as Deterministic Ethernet. In other words, the scheduling and delivery of packets within network 100 to node 11 may be precisely timed by the PCE. For example, the nodes/devices in network 100 may use a shared timing mechanism to coordinate the sending and receipt of data packets within network 100.

Figure 2:
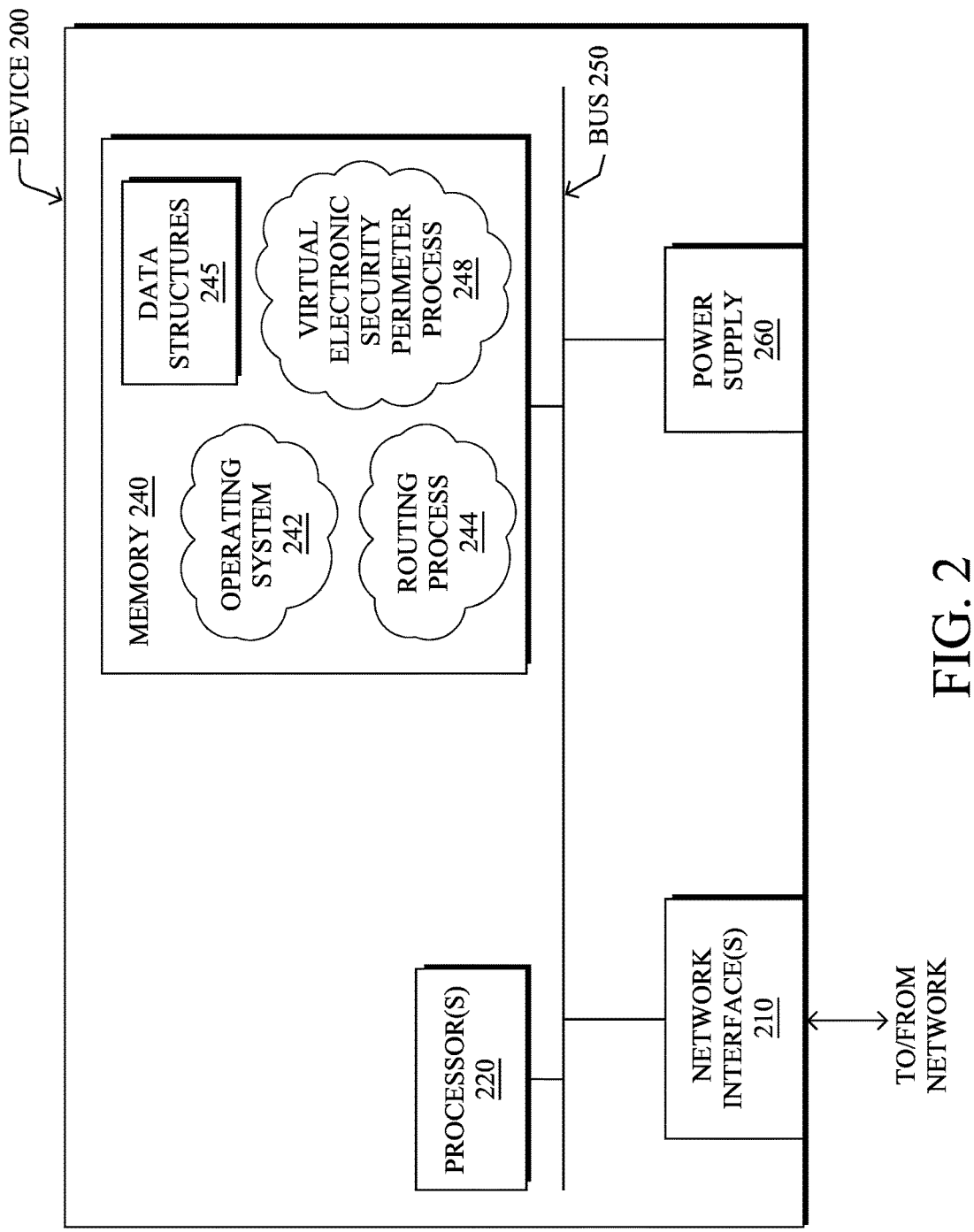
FIG. 2 illustrates an example network device/node.

FIG. 2 is a schematic block diagram of an example node/router 200 that may be advantageously used with one or more embodiments described herein, e.g., as an interested node, a Path Computation Element (PCE), etc., as detailed below. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, e.g., buffers/queues. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the router. These software processes and/or services may comprise routing process 244 and an illustrative virtual electronic security perimeter process 248. It will be apparent to those skilled in the art that other processor and memory means, including various computer-readable media, may be used to store and execute program instructions pertaining to the inventive technique described herein. Note that while routing process 244 is shown in centralized memory 240, alternative embodiments provide for the process to be specifically operated within the network interfaces 210.

Routing process 244 contains computer executable instructions executed by each processor 220 to perform functions provided by one or more routing protocols, such as the Interior Gateway Protocol (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing process 244 may also perform functions related to virtual routing protocols, such as maintaining VRF instances (not shown) as will be understood by those skilled in the art. In addition, routing process 244 may implement deterministic routing by scheduling the transmittal and/or delivery of packets within the network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
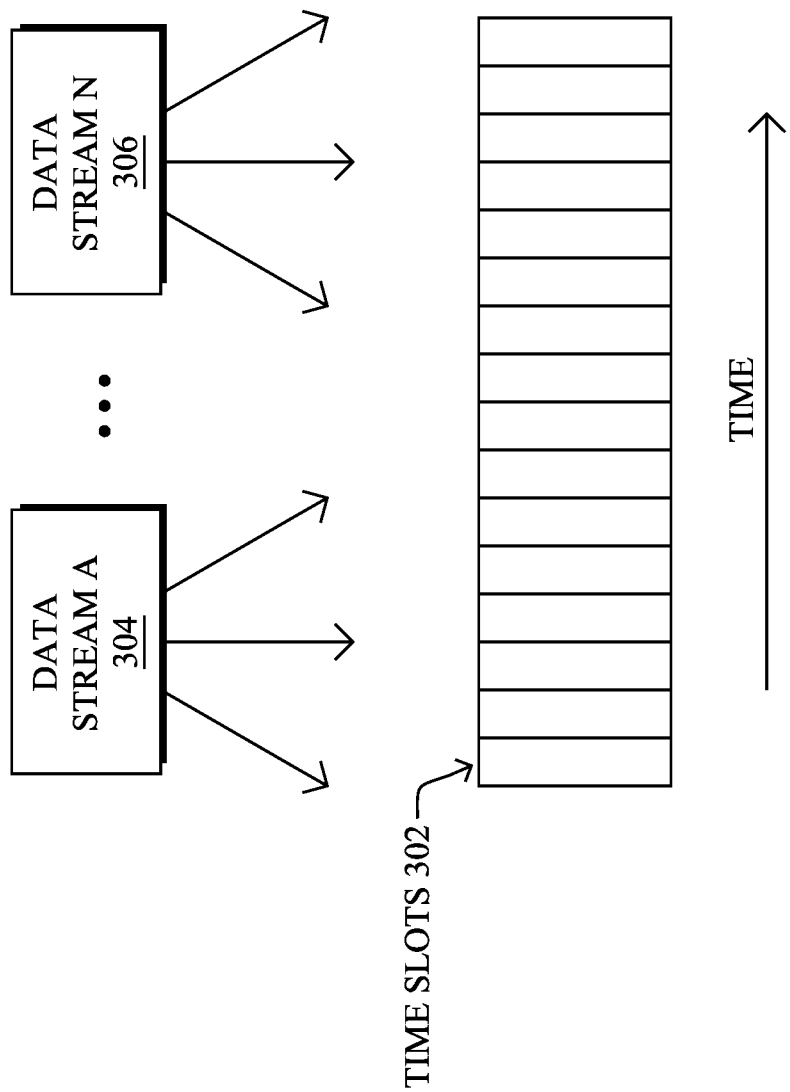
FIG. 3 illustrates an example of data streams being assigned to time slots.

FIG. 3 illustrates an example of data streams being assigned to time slots by a PCE, according to one embodiment. As shown, data transmittal may be divided into any number of time slots 302 during which a packet may be transmitted. Data packets from any number of data streams 304-306 (e.g., a first through nth data stream) may then be assigned by the PCE to time slots 302, to schedule the delivery of the packets from the various data streams. For example, a packet from data stream 304 may be assigned to a first time slot, followed by assigning a packet from data stream 306 to a second time slot, etc. In some cases, the assigned schedule may be repeated any number of times in a cyclical manner, to deliver the packets present in data streams 304, 306.

As noted above, the North American Electric Reliability Corporation (NERC) Critical Infrastructure Protection (CIP) initiative defines and enforces an electronic security perimeter for all equipment used for electrical transmission and distribution, where all communications regarding mission critical functions must be contained within a security perimeter, and all communications in and out of this perimeter must go through an Access Point ruled by strict authorization and encryption mechanisms. However, the NERC OP initiatives provide only the target requirements for a network, leaving the specific implementation details up to the end user.

——Virtual Electronic Security Perimeter Using Deterministic Networking——

The techniques herein provide a new model for implementing and ensuring an Electronic Security Perimeter (ESP) based on a Security Perimeter Manager (SPM) that computes paths between nodes within this perimeter based on deterministic networking. In some aspects, the techniques herein may leverage deterministic networking to build, manage, and ensure conformance of networks such that communications regarding mission critical functions are contained within a security perimeter, and all communications in and out of this perimeter goes through an Access Point ruled by strict authorization and encryption mechanisms. In further aspects, the SPM may derive an ESP from substation description file definitions (e.g., for an International Electrotechnical Commission (IEC) 61850 based electric substation).

Illustratively, the techniques described herein may be performed by hardware, software, and/or firmware, such as in accordance with the virtual electronic security perimeter process 248, which may include computer executable instructions executed by the processor 220 (or independent processor of interfaces 210) to perform functions relating to the techniques described herein, e.g., in conjunction with routing process 244. Notably, the illustrative virtual electronic security perimeter process 248 may be executed on any suitable device (e.g., PCE, participating nodes, servers, other devices, etc.), whether as the primary actor or as a participant in the process with such a primary actor.

Specifically, in some embodiments, a supervisory device for a network of a power substation identifies a plurality of nodes in the network of the power substation. The supervisory device associates each of the nodes with one or more security certificates. A particular security certificate authenticates a particular node to the supervisory device and authorizes the particular node to communicate in the network of the power substation. The supervisory device determines a security perimeter for the nodes in the network. The supervisory device schedules communications among the nodes using the one or more security certificates and based on the determined security perimeter.

Figure 4:
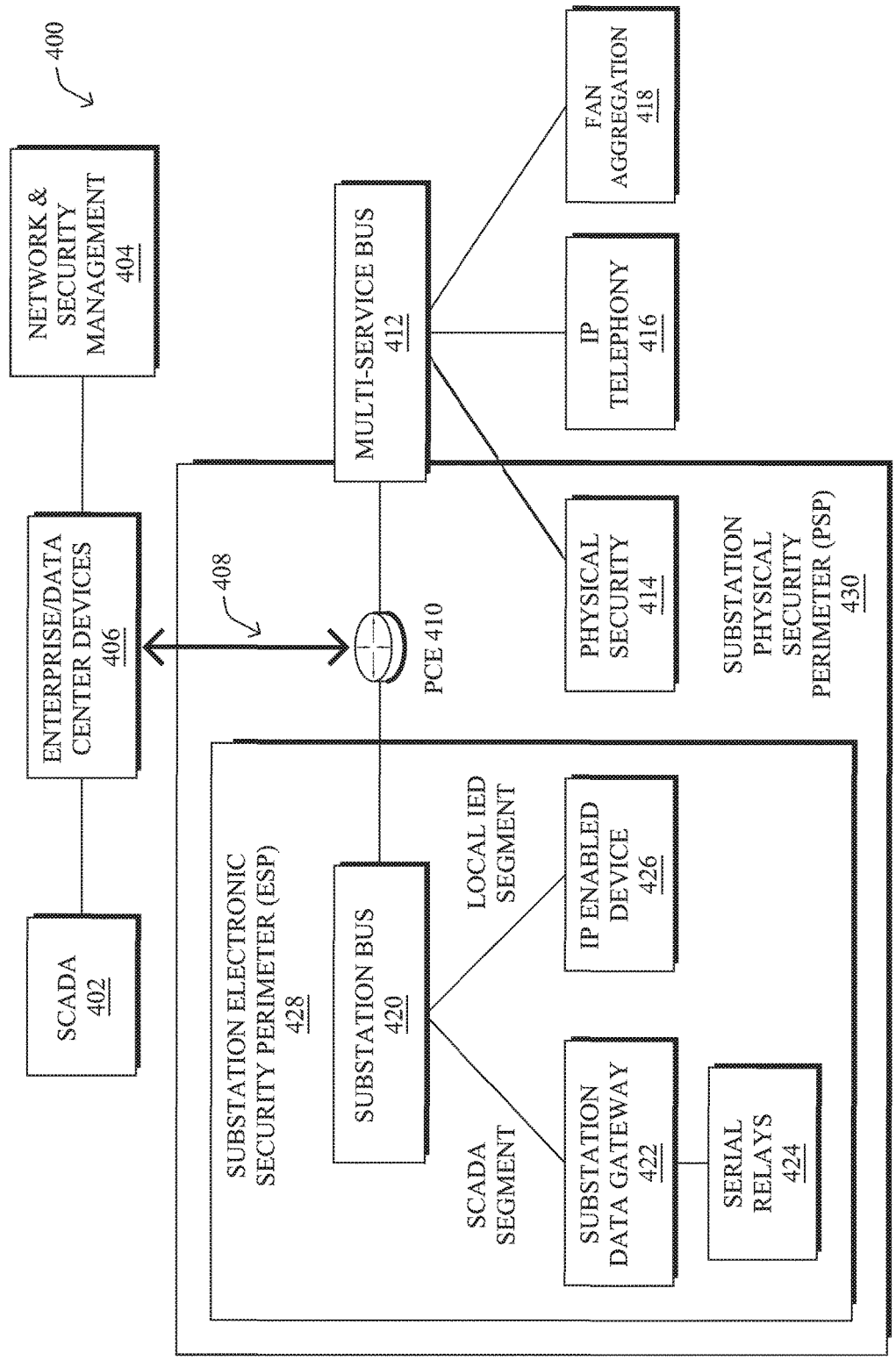
FIG. 4 illustrates an example of a substation architecture to enforce an electronic security perimeter.

Operationally, a substation architecture has been defined herein to implement and enforce an ESP. An example of such a substation architecture is shown in FIG. 4, according to various embodiments. As shown, architecture 400 may include both remote and local components for an electrical power substation that are connected by a Multiprotocol Label Switching (MPLS) WAN 408. Other forms of external network connections may be used to connect a substation or other remote location to a central location, in other embodiments.

External to the substation may be any number of enterprise/data center devices 406, such as servers, routers, switches, and the like, which may provide any number of services with respect to the substation. For example, enterprise/data center devices 406 may execute a supervisory control and data acquisition (SCADA) service 402 that provides control commands to the equipment of the substation via MPLS WAN 408 and receives measurements therefrom (e.g., for presentation to a human administrator via a user interface). In another example, enterprise/data center devices 406 may execute a network and security management service 404 that provides control over the networking and security devices of the substation via MPLS WAN 408.

Located at the substation may be a grid router or other networking device 410 connected to enterprise/data center devices 406. For example, networking device 410 may be a 2010 connected grid router from Cisco Systems, Inc. or the like. In some embodiments, networking device 410 may also function as a path computation engine (PCE), to determine the various communication pathways used in the local network of the substation.

In some embodiments, the network of the substation may comprise both a multi-service bus 412 and a substation bus 420. Generally, substation bus 420 may network the various devices that are involved in the distribution of power by the substation (e.g., as part of an electrical power grid). Multi-service bus 412, in contrast, may network the other devices located at the substation that are not directly responsible for the distribution of power in the grid.

By way of example, multi-service bus 412 may network any number of physical security devices 414, IP telephony equipment 416, and/or field area network (FAN) aggregation devices 418. Physical security devices 414 may implement a physical security perimeter (PSP) 430 for the substation, to physically protect the devices of the critical infrastructure from unauthorized physical tampering. For example, physical security devices 414 may include security cameras, biometric readers, motion detectors, keycard readers, door or gate locks, and the like, to prevent unauthorized physical access to the equipment in PSP 430.

Substation bus 420 may connect any number of devices associated with the power distribution by the substation and are located within PSP 430. For example, substation bus 420 may include any number of local, IP-enabled intelligent electronic devices (IEDs) 426. As would be appreciated, IEDs are typically computerized devices that provide functions for the critical infrastructure such as electrical protection and local control intelligence. Substation bus 420 may also connect any number of serial relays 424 via a substation data gateway 422.

Also, architecture 400 may implement an electronic security perimeter (ESP) 428 that protects the equipment of the critical infrastructure from unauthorized virtual/cyber intrusions. For example, networking device 410 (e.g., a connected grid router/PCE, etc.) may implement ESP 428 by differentiating the subnets and dedicating different subnets for the critical flows (e.g., within ESP 428), as compared to other non-critical flows through access control lists (ACLs). To comply with regulatory requirements, ESP 428 must be maintained within PSP 430 and all of the links IN or OUT of PSP 430 should permit only predefined information to flow, while preventing undesired traffic such as firmware updates, etc. from entering or exiting ESP 428. Further, by requirement, communications between a control center (e.g., the control center housing devices 406) and the devices in ESP 428 must go over an Access Point/Gateway, such as PCE 410.

Figure 5:
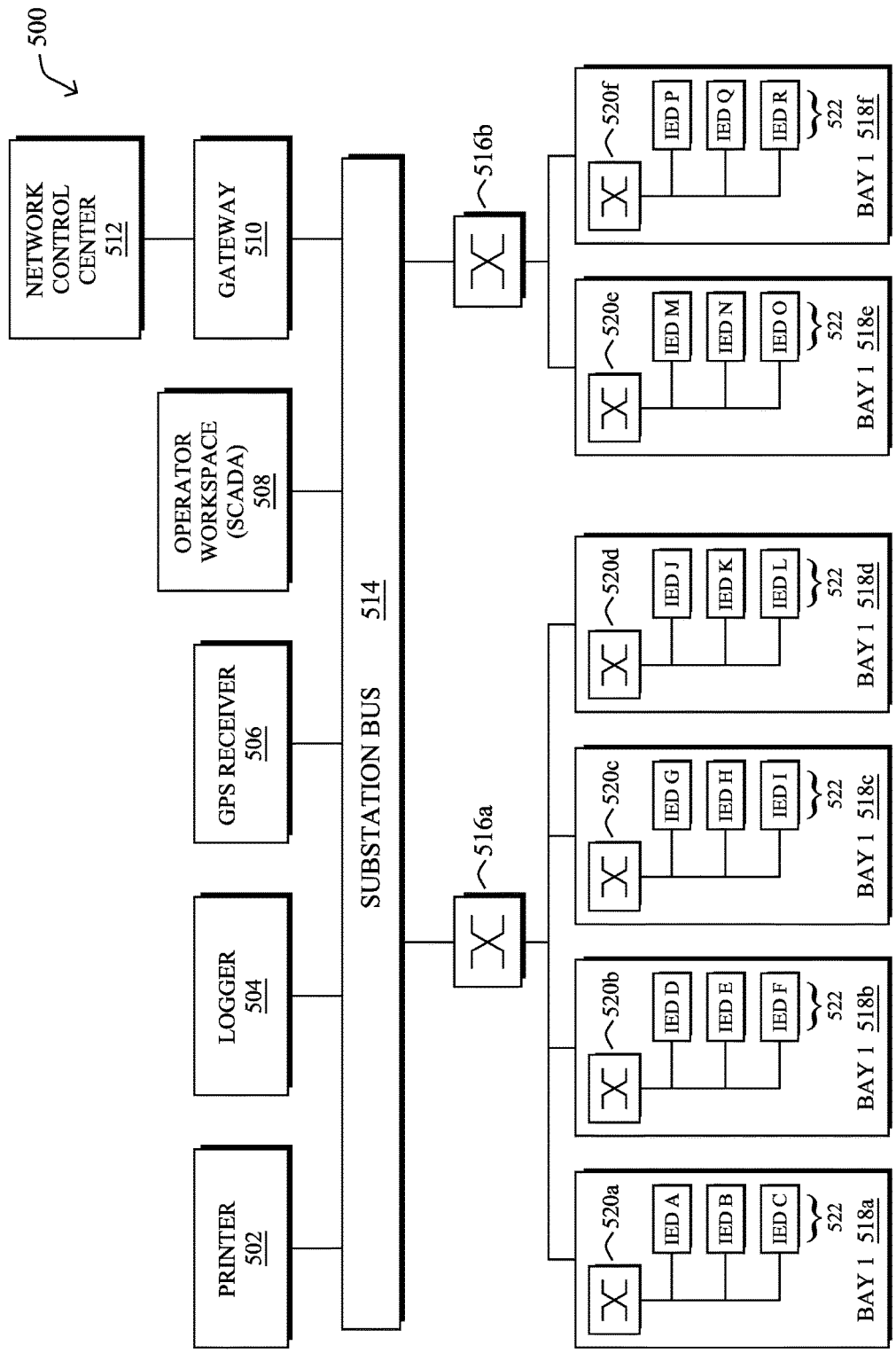
FIG. 5 illustrates an example of a substation.

FIG. 5 illustrates an example of a substation 500 in greater detail, according to various embodiments. As shown, substation 500 may comply with International Electrotechnical Commission's (IEC) 61850 standard, which defines a communication mechanism that allows IEDs 522 from different vendors to communicate with one another.

Typically, IEDs 522 are located and subdivided into different bays 518. For example, a first bay 518*a* may include IEDs A-C, a second bay 518*b* may include IEDs D-F, a third bay 518*c* may include IEDs G-I, etc., up to a twelfth bay 518*f* that includes IEDs P-R. Any number of IEDs 522 may be located in any number of bays 518, depending on the deployment. Each bay 518 may include corresponding network devices 520 that connect the local IEDs 522 in the bay with one another. In addition, different bays 518 may be connected to one another via networking devices 516 and to substation bus 514. For example, device 516*a* may connect bays 518*a*-518*d*, device 516*b* may connect bays 518*e*-518*f*, etc., while substation bus 514 connects devices 516*a* and 516*b*, thereby allowing IEDs 522 located in different bays 518 to communicate with one another.

Also connected to substation bus 514 may be other equipment that are to be included in the physical security perimeter (PSP) and electronic security perimeter (ESP) of the substation. For example, other protected equipment may include a printer 502, logger 504, global positioning system (GPS) time receiver 506, operator workspace/workstation 508 that provides local SCADA control over the local equipment, or the like. As part of the implemented ESP, a gateway 510 (e.g., a connected grid router, etc.) may control which traffic is allowed into, or out of, substation bus 514. For example, gateway 510 may serve as an Access Point between the devices in the ESP and the devices located in a centralized network control/data center 512.

The IEC 61850 standard also specifies a substation configuration language (SCL) that is used to describe all of the nodes/devices in the network, as well as their communication flows. For example, an SCL-based, substation description file may be written in XML or another suitable format, to describe the nodes/devices in a substation and the communication flows between them. Notably, communications under IEC 61850 are based on Generic Object Oriented Substation Event (GOOSE), Sampled Value, and multimedia messaging service (MMS) messages. These communication flows also have deterministic behavior and are described and engineered according to the substation description file. Thus, in IEC 61850-based substations, the communications that may occur within a defined ESP are predefined and known.

Figure 6:
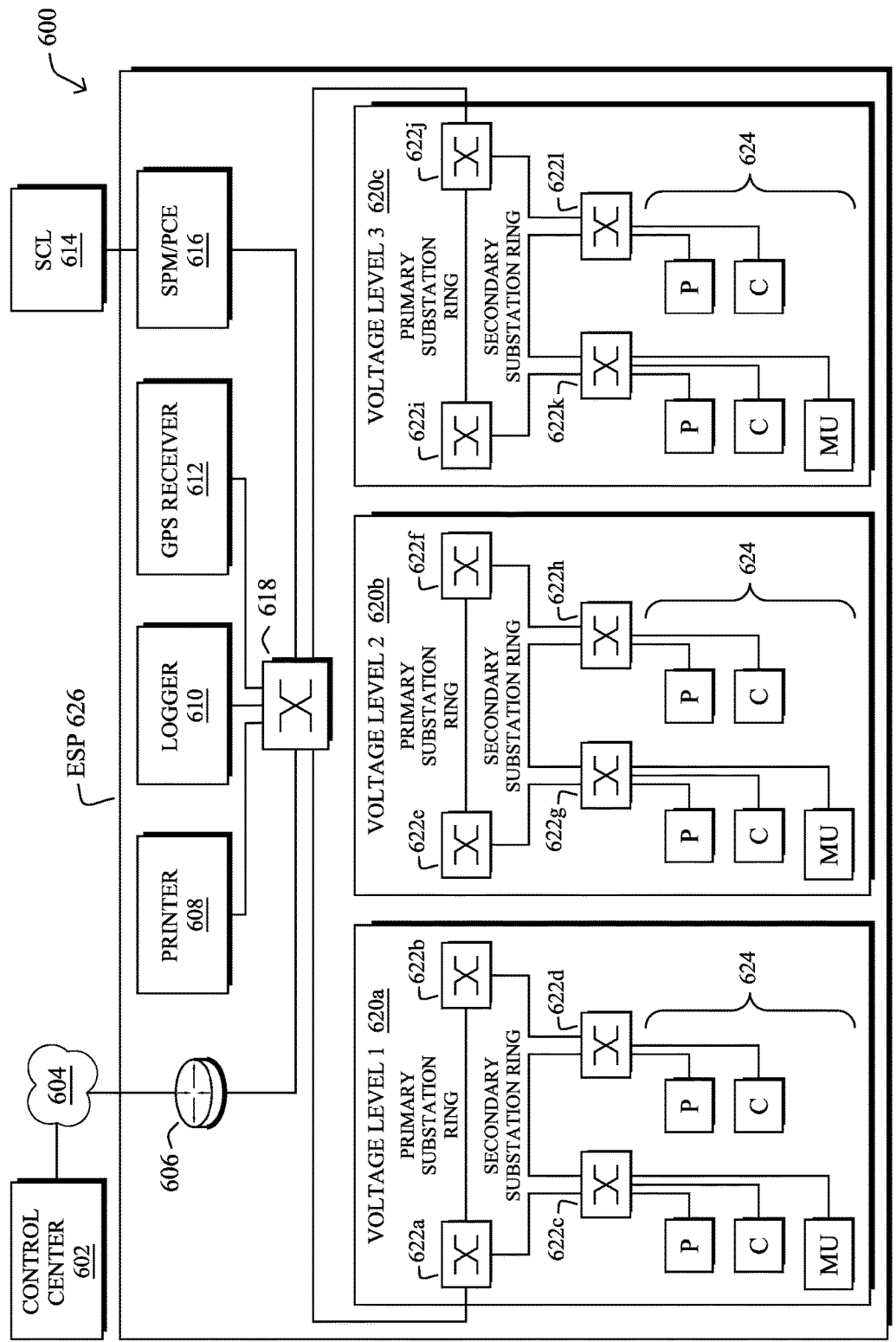
FIG. 6 illustrates an example topology for a virtual electronic security perimeter using deterministic networking.

Referring now to FIG. 6, an example topology 600 is illustrated for a virtual electronic security perimeter using deterministic networking. According to various embodiments, a security perimeter manager (SPM) is introduced herein. In general, the SPM is a software service/process (e.g., as part of process 248) that ensures that an ESP 626 is strictly implemented and enforced in the network of the substation, based on a pre-configured model.

In some embodiments, some or all of the communications within ESP 626 may be deterministic. Thus, in some cases, the SPM may be co-located with a path computation engine (PCE) (e.g., as part of a routing process 244) on a supervisory networking device, such as device 616 shown (e.g., a server, router, etc.), or integrated into another device (e.g., access point 606, etc.). Generally, the PCE is responsible for computing all of the deterministic paths between the nodes within the ESP and then push the paths to the communicating devices. In other words, the SPM and PCE may operate in conjunction with one another to ensure that a given path computed by the PCE stays within ESP 626.

Within ESP 626 may be any number of nodes/devices, such as a printer 608, logger 610, GPS receiver 612, as well as the networked IEDs 624, located in the various bays in the substation. As would be appreciated, IEDs 624 may include merging unit (MU) IEDs, protection (P) IEDs, and/or control (C) IEDs, which oversee the physical equipment of the power infrastructure. The various banks of IEDs 624 may operate as groups 620a-620c, to provide voltage at various levels, as part of the power grid. Further examples of nodes/devices that may be found in ESP 626 may include logic controllers, such as programmable logic controllers (PLCs) and/or virtualized nodes.

Networking devices 618, 622 (e.g., switches, etc.) may connect IEDs 624 with the other devices in ESP 626 and across different IED banks. For example, devices 622a-622d may form a secondary substation ring that connects the banks of IEDs associated with the first voltage level. Similarly, a primary substation ring may be formed through the connections between networking device 618, 622a-622b, etc. As noted, the PCE of 616 may schedule the communications between the devices in ESP 626, based on the available paths between networking devices 618, 622, in a deterministic manner. Thus, a scheduled communication sent from one IED 624 to another IED 624, or between other nodes in ESP 626, may arrive within a very controlled timeframe. Also as shown, an access point 606 may connect ESP 626 with a control center 604 via a WAN 604.

In various embodiments, the SPE of supervisory device 616 may associate security certificates with each of the IEDs 624, controllers, or other nodes of the substation. For example, supervisory device 616 may process an SCL-based description file 614 that identifies the various IEDs 624 and other nodes/devices in the substation included in ESP 624, as well as their communications. In some cases, SCL 614 may also include references to the security certificate(s) per node in ESP 624. Generally, the security certificates are used by the SPM to authenticate and authorize communications between the SPM and the various nodes. In other words, the use of the certificates ensures that no communications can be established without the proper authentication of the requesting device.

During operation, the SPM may implement and enforce ESP 626 as follows:

1.) The certificates are pre-configured and engineered in the communications nodes (e.g., IEDs 624, controllers, nodes, etc.).
2.) The SPM of supervisory device 616 reads the SCL 614 and the references to the certificates, to identify the devices/nodes in the network and associate the nodes with their certificates.
3.) The SPM of supervisory device 616 request the PCE to compute all the paths/schedules for the network, while taking into account the requirements/constraints for ESP 626, and to push the computed paths/schedules to the node. The SPM can also push specific policies (ACLs, VLANs . . . ) to the nodes, such as for certain traffic ingressing or egressing ESP 626 via access point 606 (e.g., to communicate with control center 602).
4.) When an IED 624, other node, controller, etc. in ESP 626 wants to establish a new communication with another node, it may send a request to the SPM/PCE of supervisory device 616 for the new path. In turn, the SPM ensures that both nodes within ESP 626 and the PCE computes paths that stay within the ESP domain.

This same topology 600 could also be used to establish non-critical communications or communications that are not considered as part of ESP 626. In this case, the isolation of the traffic may be achieved by the deterministic networking technology (e.g., fully scheduled traffic using 802.1Qbv, 802.1Qbu, etc.). By design, the deterministic traffic (e.g., between the IEDs 624) is not affected by the other traffic and vice-versa.

Figure 7:
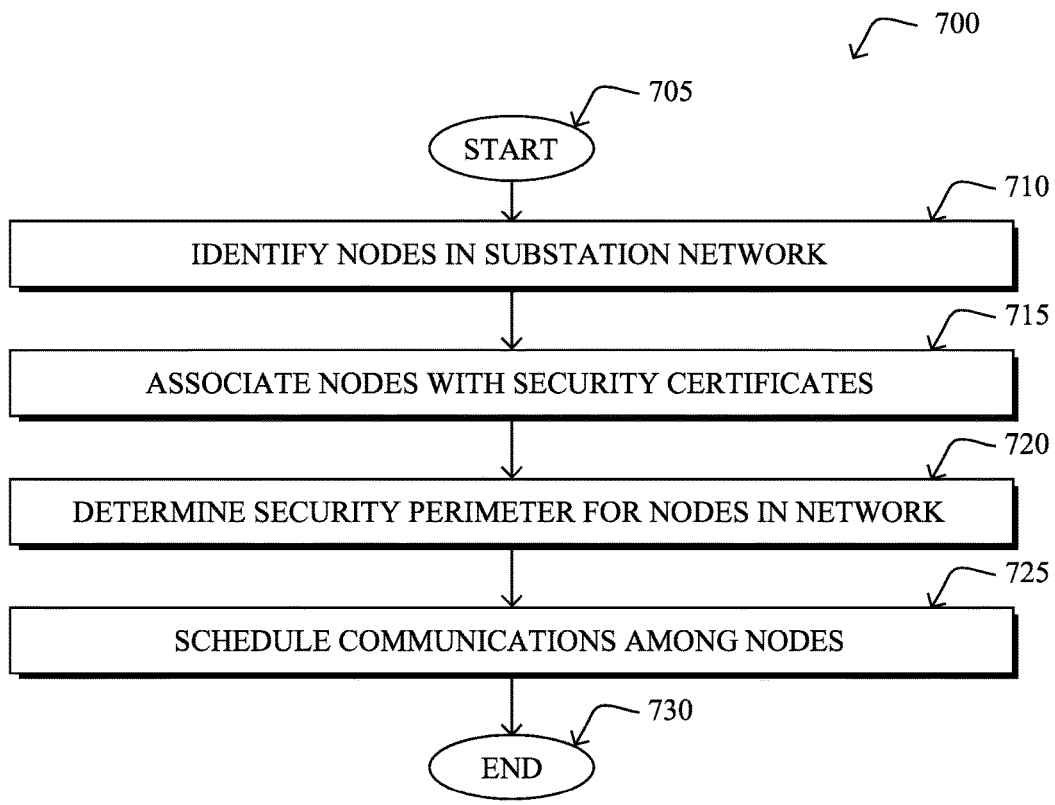
FIG. 7 illustrates an example simplified procedure for implementing a security perimeter in a network of a substation.

FIG. 7 illustrates an example simplified procedure 700 for implementing a security perimeter in a network of a substation, according to various embodiments. In various embodiments, procedure 700 may be performed by a specialized device (e.g., a device 200) by executing stored instructions (e.g., process 248), such as a supervisory device in a network. Procedure 700 may begin at step 705 and continues on to step 710 where, as described in greater detail above, the device may identify nodes in the network of the substation. For example, the device may analyze a substation description file (e.g., an SDL file) that describes the plurality of IEDs, controllers, or other nodes, as well as the communications between these entities.

At step 715, as detailed above, the device may associate each of the nodes with one or more security certificates. In general, such certificates may authenticate a particular node to the supervisory device and authorize the particular node to communicate in the network of the power substation. For example, in some embodiments, the nodes may be pre-assigned security certificates and/or the device may obtain information regarding the security certificates from the substation description file.

At step 720, the device may determine a security perimeter for the nodes, as described in greater detail above. In various embodiments, the perimeter may be an electronic security perimeter (ESP) that segregates and protects the communications between the nodes from potential malicious actors. For example, the security perimeter may strictly enforce that all node communications either stay within the security perimeter or ingress/egress through a designated access point.

At step 725, as detailed above, the device may schedule communications among the nodes, using the one or more security certificates and based on the determined security perimeter. For example, the device may assign a particular communication between two nodes to a selected timeslot as part of a deterministic schedule. Further, the device may use the certificates to authenticate the identities of the nodes (e.g., when an IED requests a new communication slot, etc.). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide a virtual electronic security perimeter using deterministic networking. In particular, the techniques herein manage all communications in a secure manner and with the guarantee that it will stay within the defined security perimeter, supporting compliance with security standards such as NERC CIP. Notably, the techniques herein may also allow the visualization of the ESP and the nodes and paths.

While there have been shown and described illustrative embodiments that provide for a virtual electronic security perimeter using deterministic networking, it is to be understood that various other adaptations and modifications may be made within the spirit and scope of the embodiments herein. For example, while certain embodiments are described herein with respect to particular protocols (e.g., NERC CIP, specifically), the embodiments are not limited as such, and may be used for other protocols, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   identifying, by a supervisory device for a deterministic network of a power substation, a plurality of nodes in the deterministic network of the power substation;
   associating, by the supervisory device, each of the nodes with one or more security certificates, wherein a particular security certificate authenticates a particular node of the nodes to the supervisory device and authorizes the particular node to communicate in the deterministic network of the power substation;
   forming, by the supervisory device, an electronic security perimeter for the nodes using deterministic networking, wherein deterministic paths to the nodes are computed so that traffic from outside the electronic security perimeter must pass through a particular device; and
   scheduling, by the supervisory device, deterministic communications among the nodes using the one or more security certificates and based on the electronic determined security perimeter.

2. The method of claim 1, wherein the deterministic networking controls when a data packet arrives at a destination.

3. The method as in claim 1, further comprising:
   receiving, at the supervisory device, a request from one of the nodes to communicate with another one of the nodes, wherein the request includes one or more security certificates associated with the requesting node, wherein the requesting node is an intelligent electronic device (IED); and
   authenticating, by the supervisory device, the requesting node based on the one or more security certificates included in the request; and
   authorizing, by the supervisory device, the requesting node to communicate with the other IEDs.

4. The method as in claim 3, further comprising:
   scheduling, by the supervisory device, a communication between the requesting node and the other node.

5. The method as in claim 1, wherein identifying a plurality of nodes in the deterministic network of the power substation comprises:
   analyzing, by the supervisory device, a substation description file that describes the plurality of nodes and communications between the nodes.

6. The method as in claim 1, wherein the plurality of nodes comprise one or more intelligent electronic devices (IEDs) or controllers.

7. The method as in claim 1, wherein the electronic security perimeter isolates the nodes from other traffic in the deterministic network.

8. An apparatus, comprising:
   one or more network interfaces to communicate with a deterministic network;
   a processor coupled to the network interfaces and configured to execute one or more processes; and
   a memory configured to store a process executable by the processor, the process when executed operable to:
   identify a plurality of nodes in the deterministic network;
   associate each of the nodes with one or more security certificates, wherein a particular security certificate authenticates a particular node of the nodes to the apparatus and authorizes the particular node to communicate in the deterministic network;
   form an electronic security perimeter for the nodes using deterministic networking, wherein deterministic paths to the nodes are computed so that traffic from outside the electronic security perimeter must pass through a particular device; and
   schedule deterministic communications among the nodes using the one or more security certificates and based on the determined electronic security perimeter.

9. The apparatus as in claim 8, wherein the process when executed is further operable to:
   receive a request from one of the nodes to communicate with another one of the nodes, wherein the request includes one or more security certificates associated with the requesting node; and
   authenticate the requesting node based on the one or more security certificates included in the request; and authorize the requesting node to communicate with the other node.

10. The apparatus as in claim 9, wherein the process when executed is further operable to:
schedule a communication between the requesting node and the other node.

11. The apparatus as in claim 8, wherein the apparatus identifies a plurality of nodes in the deterministic network by:
analyzing a substation description file that describes the plurality of nodes and communications between the nodes; and
analyzing certificate data included in the substation description file.

12. The apparatus as in claim 8, wherein the plurality of nodes comprise one or more intelligent electronic devices (IEDs) or controllers.

13. The apparatus as in claim 8, wherein the electronic security perimeter isolates the nodes from other traffic in the deterministic network.

14. The apparatus as in claim 8, wherein the deterministic networking controls when a data packet arrives at a destination.

15. The apparatus as in claim 8, wherein the apparatus is a path computation engine (PCE).

16. A tangible, non-transitory, computer-readable medium storing program instructions that cause a supervisory device for a deterministic network of a power substation to execute a process comprising:
identifying, by the supervisory device, a plurality of nodes in the deterministic network of the power substation;
associating, by the supervisory device, each of the nodes with one or more security certificates, wherein a particular security certificate authenticates a particular node of the nodes to the supervisory device and authorizes the particular node to communicate in the deterministic network of the power substation;
forming, by the supervisory device, an electronic security perimeter for the nodes using deterministic networking, wherein deterministic paths to the nodes are computed so that traffic from outside the electronic security perimeter must pass through a particular device; and
scheduling, by the supervisory device, deterministic communications among the nodes using the one or more security certificates and based on the determined electronic security perimeter.

17. The computer readable medium as in claim 16, wherein the process further comprises:
receiving, at the supervisory device, a request from one of the nodes to communicate with another one of the nodes, wherein the request includes one or more security certificates associated with the requesting node; and
authenticating, by the supervisory device, the requesting node based on the one or more security certificates included in the request; and
authorizing, by the supervisory device, the requesting node to communicate with the other node.

18. The computer readable medium as in claim 16, wherein identifying a plurality of nodes in the deterministic network of the power substation comprises:
analyzing, by the supervisory device, a substation description file that describes the plurality of nodes and communications between the nodes.

19. The computer readable medium as in claim 18, wherein associating each of the nodes with one or more security certificates comprises:
analyzing, by the supervisory device, certificate data included in the substation description file.

20. The computer readable medium as in claim 18, wherein the deterministic networking controls when a data packet arrives at a destination.

* * * * *

UNITED STATES PATENT AND TRADEMARK OFFICE
CERTIFICATE OF CORRECTION

PATENT NO. : 10,516,661 B2
APPLICATION NO. : 15/430617
DATED : December 24, 2019
INVENTOR(S) : Patrick Wetterwald et al.

It is certified that error appears in the above-identified patent and that said Letters Patent is hereby corrected as shown below:

In the Specification

In Column 4, Line 43, please amend as shown:
tion and encryption mechanisms. However, the NERC CIP Signed and Sealed this
Thirtieth Day of June, 2020

Andrei Iancu
*Director of the United States Patent and Trademark Office*